United States Patent [19]

Villata

[11] Patent Number: 4,598,801
[45] Date of Patent: Jul. 8, 1986

[54] CLAMPING DEVICE

[75] Inventor: Gino Villata, Buttigliera D'Asti, Italy

[73] Assignee: Valeo, Paris, France

[21] Appl. No.: 624,906

[22] Filed: Jun. 26, 1984

[30] Foreign Application Priority Data

Jun. 30, 1983 [FR] France ............................. 83 10882

[51] Int. Cl.⁴ .............................................. F16D 65/56
[52] U.S. Cl. ............................. 188/71.9; 188/196 BA
[58] Field of Search .................... 188/71.9, 71.8, 71.7, 188/72.8, 79.5 K, 79.5 P, 196 BA, 196 D, 196 P, 72.7, 72.9; 192/111 R

[56] References Cited

U.S. PATENT DOCUMENTS

| 3,121,478 | 2/1964 | Bostwick | 188/79.5 K |
| 3,190,399 | 6/1965 | Bowen et al. | 188/79.5 K X |
| 3,322,235 | 5/1967 | Forbush | 188/79.5 K X |
| 3,724,607 | 4/1973 | Reinecke | 188/79.5 K |
| 3,997,035 | 12/1976 | Zeidler | 188/79.5 K |
| 4,114,733 | 9/1978 | Knight | 188/79.5 K X |

FOREIGN PATENT DOCUMENTS

| 2030689 | 11/1970 | France . | |
| 2504224 | 10/1982 | France . | |
| 1152960 | 5/1969 | United Kingdom | 188/79.5 K |
| 1540237 | 2/1979 | United Kingdom . | |
| 2054075 | 2/1981 | United Kingdom | 188/71.9 |

Primary Examiner—Duane A. Reger
Assistant Examiner—Michael P. Gilday
Attorney, Agent, or Firm—Young & Thompson

[57] ABSTRACT

A brake is provided with a wear compensator designed to maintain the stroke of the clamping element constant; the clamping element incorporating an extendable part which is gradually extended as a result of wear of the friction pads of the brake. The extendable part comprises a nut which is extended by rotation of a screw; the screw being driven via a ratchet wheel connected to the control lever by which the brake is operated.

8 Claims, 3 Drawing Figures

CLAMPING DEVICE

BACKGROUND TO THE INVENTION

The present invention relates to a clamping device, such as a brake or the like, which has friction means and a compensator for the wear of these friction means, the said compensator being designed to make the forward and return stroke of an element clamping the friction means substantially constant by keeping it between two closely set fixed values, the clamping element being carried by a support which is displaced both during the forward movement and during the return movement under the action of a control means and which incorporates an extendable part, this extendable part being extended in response to an increase in the wear so as to compensate this, under the action of a ratchet wheel, the pawl of which is attached to the control means and each tooth of which defines the variation between the two closely set fixed values of the forward and return stroke of the clamping element.

In general terms, clamping devices, such as brakes or the like, equipped with such a wear compensator have a complex and sensitive construction.

The subject of the present invention is a clamping device, such as a brake or the like, of the type mentioned above, the construction of which is simple and robust, together with an excellent mode of operation.

SUMMARY

According to the invention, the clamping device, such as a brake or the like, of the type mentioned above is characterised in that the ratchet wheel acts on the extendable part by means of a transmission member which is connected respectively, by means of three calibrated friction clutches to the ratchet wheel, to the pawl and to the support, in such a way that this transmission member remains immobile when the pawl moves to the exclusion of the ratchet wheel, and is driven when the pawl and the ratchet wheel move together.

As a result of this arrangement, the wear compensator benefits from accurate calibration, together with a particularly convenient construction.

According to another characteristic, the transmission member is a shaft mounted to rotate on the support, the pawl and the ratchet wheel themselves being mounted to rotate on the support coaxially with the said shaft. Thus, the device is very simple to assemble, allowing adjustment to be carried out easily.

According to yet another characteristic, the calibrated friction clutches are made by means of friction washers interposed between the shaft, the pawl, the ratchet wheel and the support and subjected to the clamping of a common elastic means.

Such an arrangement makes it possible to achieve a simple and compact construction.

DETAILED DESCRIPTION OF AN EMBODIMENT OF THE INVENTION

Figure 1:
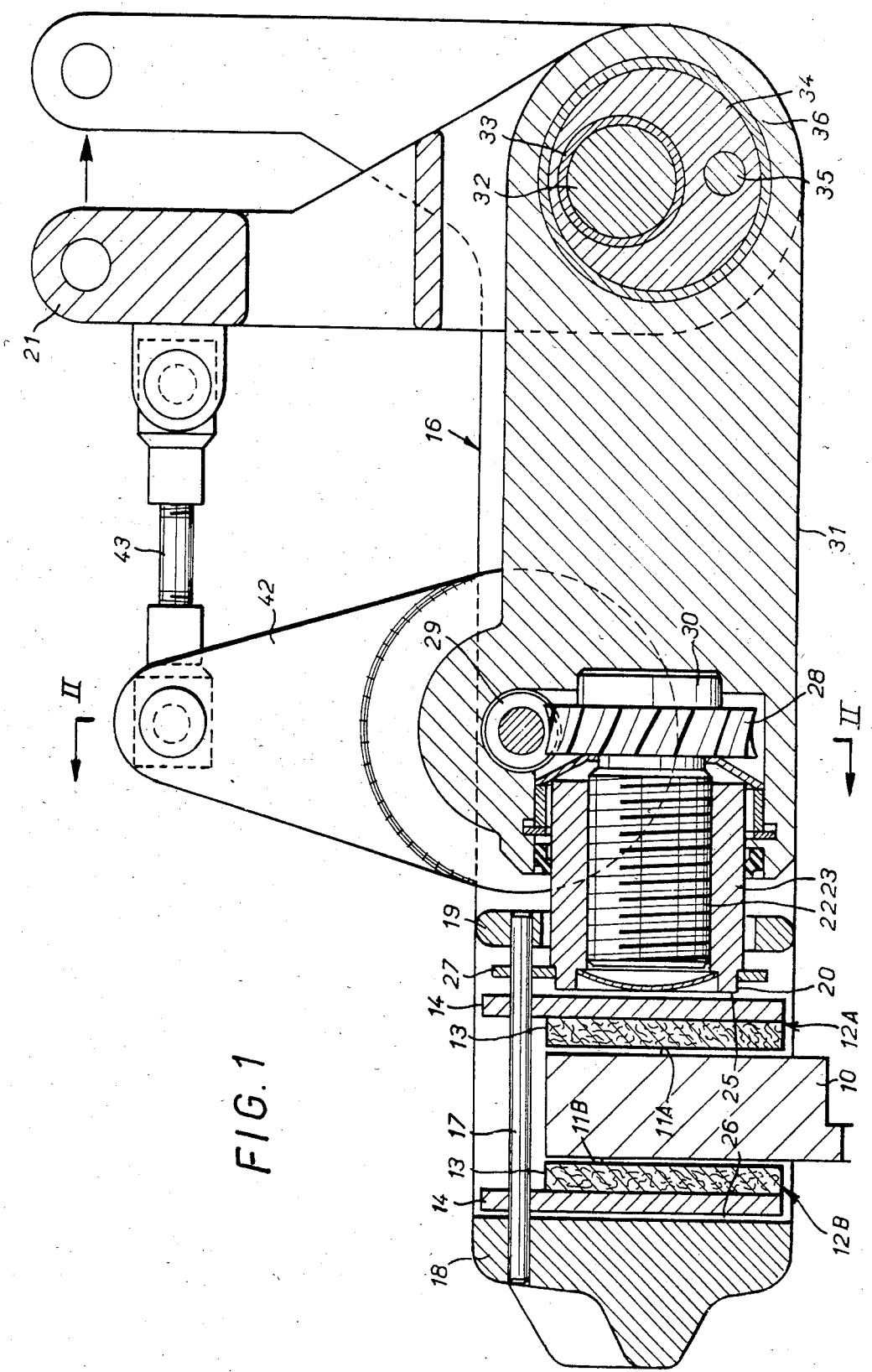
FIG. 1 is a diagrammatic sectional view of a brake equipped with a wear compensator according to the invention.
Figure 3:
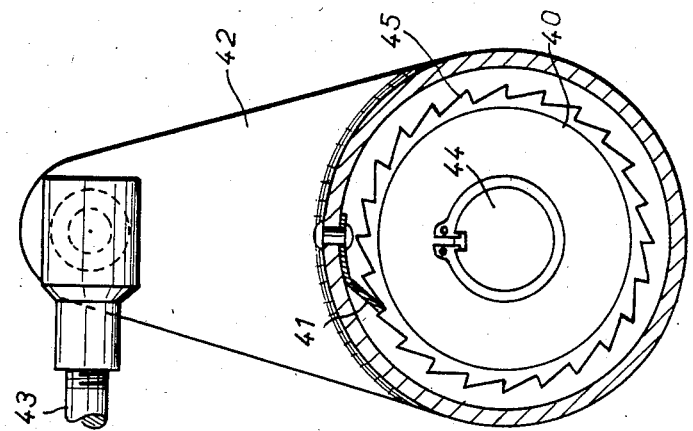
FIG. 3 is a view of the wear compensator in a section along the broken line III—III of FIG. 2.
Figure 2:
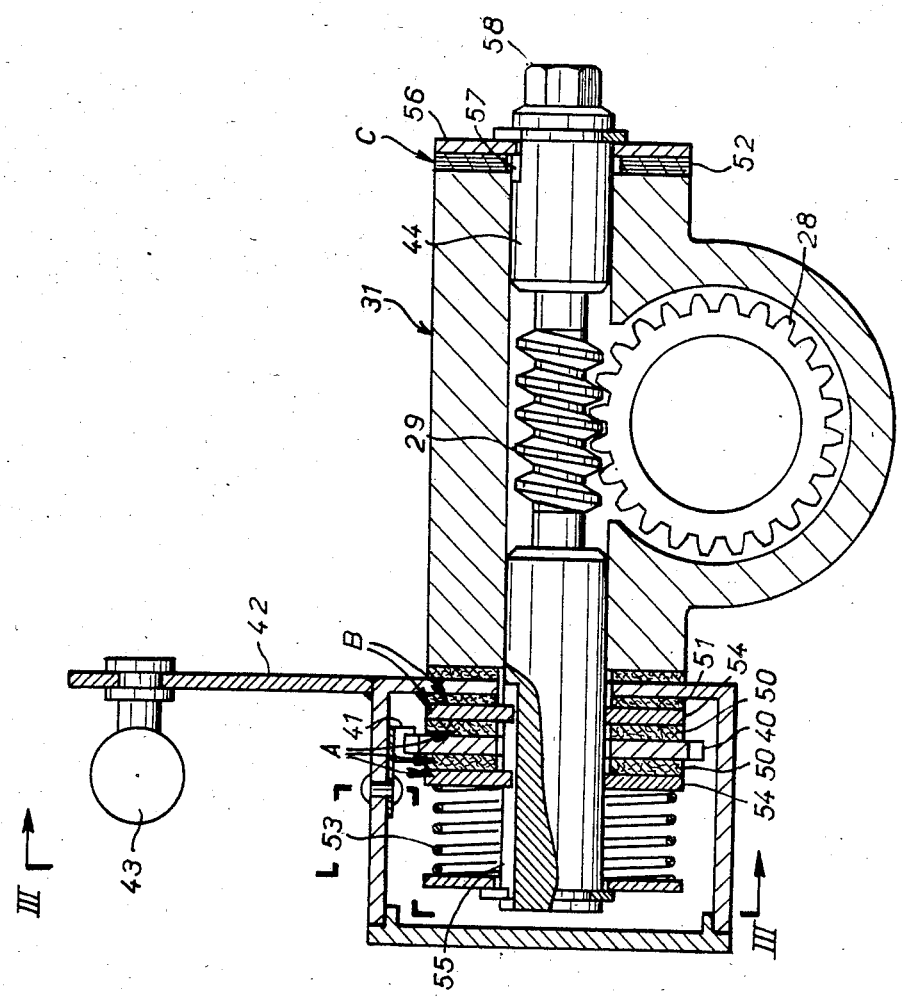
FIG. 2 is a view of this wear compensator in a section along the line II—II of FIG. 1.

The embodiment illustrated in FIGS. 1 to 3 relates, by way of non-limiting example, to a use of the invention in a disk brake for parking braking, especially for a motor vehicle. The control of the brake incorporates a wear-compensating device.

FIG. 1 shows at 10 the disk of the brake which has two opposite rotating tracks 11A and 11B which are designed to frictionally engage friction means 12A and 12B consisting of brake pads.

Each pad 12A, 12B comprises a lining made of friction material 13 intergral with a support 14. Each pad 12A, 12B is allowed to be laid against the corresponding friction track 11A, 11B of the disk 10 by means of the surface of the lining 13 which is opposite the support 14. The force is transmitted by means of the support 14 to each pad 12A, 12B so as to clamp it against the disk 10.

The brake incorporates a floating stirrup 16 which caps the disk 10 and in which the pads 12A, 12B are mounted. The supports 14 of the pads 12A and 12B are mounted to slide on rods 17 carried by an end web 18 and by an intermediate web 19 of the stirrup 16.

A clamping element 20 interacts with the friction means 12A, 12B and is mounted so as to be moveable relative to the stirrup 16 with a forward and return stroke between a retracted release position (shown in FIG. 1) and an advanced clamping position and vice versa, the clamping position being more advanced, the more the friction means 12A, 12B are worn. The clamping element 20 is carried by a support 31 which is displaced both during the forward movement and during the return movement under the action of a control means, such as a lever 21. The support 31 incorporates an extendable part 22, 23. This part 22, 23 comprises a screw 22 and a nut 23 and is allowed to be extended as a result of the unscrewing effect of the screw 22 and the nut 23.

In the example illustrated in FIG. 1, the clamping element 20 consists of an annular boss of the nut 23 and has an outer face 25, by means of which the clamping element 20 is allowed to push against the support 14 of the pad 12A. The web 18 of the body 16 also has a reaction face 26, against which bears the support 14 of the other pad 12B.

The nut 23 forming the clamping element 20 is prevented from rotating by an annular anti-rotation piece 27 which is substantially fixed angularly and movable in translation, being engaged to slide on the rods 17.

The screw 2 is integral with a gear wheel 28 meshing with an endless screw 29 in order to compensate the wear of the friction means 12A, 12B in a way which will be described in detail later.

The assembly consisting of the screw 22 and the wheel 28 has a cylindrical endpiece 30 mounted to rotate in the support 31 which is actuated so as to slide by means of the control lever 21.

The body 16 carries a journal 32 which has a cylindrical outer surface 33. Mounted about the journal 32 are, on the one hand, the lever 21 and, on the other hand, a core 34 which is made integral with the lever 21 by means of a pin 35.

The core 34 has a cylindrical outer surface 36 offset relative to the cylindrical outer surface 33 of the journal 32.

The extendable part 22, 23 (FIGS. 1 to 3) is extended under the action of a ratchet wheel 40, the pawl 41 of which is integral with a lever 42 attached by a connecting rod 43 to the control lever 21.

The endless screw 29 for controlling the extension of the part 22, 23 is integral with a shaft 44 which is mounted to rotate on the support 31 and about which the ratchet wheel 40 and the lever 42 carrying the pawl 41 are mounted to rotate.

The forward and return stroke of the clamping element 20 is maintained between two closely set constant values, the variation between which is defined by each tooth 45 of the ratchet wheel 40.

This ratchet wheel 40 acts on the extendable part 22, 23 by means of the shaft 44 constituting a transmission member. This shaft 44 is connected respectively, by means of three calibrated friction elements A, B, C to the ratchet wheel 40, to the pawl 41 and to the support 31, in such a way that the shaft 44 is immobile when the pawl 41 moves to the exclusion of the ratchet wheel 40 and is driven when the pawl 41 and the ratchet wheel 40 move together.

Each of the three friction elements A, B, C is designed to oppose a predetermined resistance RA, RB, RC to any force tending to make it slide, the connection being either fixed or sliding, depending on whether the force is below or tends to be greater than the predetermined resistance.

The predetermined resistance RC of the friction element C between the shaft 44 and the support 31 is greater than the predetermined resistance RB of the friction element B between the pawl 41 and the shaft 40 and is less than the sum of the predetermined resistances RB and RA of the friction element B between the pawl 41 and the shaft 44 and the friction element A between the ratchet wheel 40 and the shaft 44, thus:

$$RB < RC < RB + RA$$

In the example illustrated in FIGS. 1 to 3, the friction elements A, B, C are made by means of friction washers, such as the washers 50, 51 and 52, interposed between the shaft 44 and respectively the lever 42 carrying the pawl 41, the ratchet wheel 40 and the support 31. These washers 50, 51 and 52 are subjected to the clamping of a common calibrated elastic means 53, such as a helical spring.

More particularly, in the example illustrated in FIG. 2, two friction washers 50 are arranged on either side of the ratchet wheel 40 and are subjected to the gripping action of two annular plates 54 engaged on one or more splines 55 of the shaft 44 so as to be integral in terms of rotation and free in terms of translation. The friction washer 51 is interposed between one of these plates 54 and the lever 42 carrying the pawl 41. The friction washer 52 is interposed between the support 31 and an annular plate 56 which is engaged on one or more splines 57 of the shaft 44 so as to be integral in terms of rotation and free in terms of translation. The spring 53 ensures the clamping of the various washers 50, 51, 52 and is located at one of the ends of the shaft 44. At its other end, the shaft 44 has a hexagonal endpiece 58 which constitutes a manual setting means for calibrating the angular position of the shaft 44 in order to adjust the stroke of the clamping element 20 as desired. It will be appreciated that such a setting does not invlove components other than the shaft 44 itself.

In the retracted release position, the clamping element 20 is spaced from the pad 12A. The brake is released, as shown in FIG. 1.

For braking, the lever 21 is actuated towards the right in FIG. 1.

Because of the offset assembly 32, 34, the support 31 is stressed towards the left in FIG. 1 and exerts, by means of the parts 22, 23 and the clamping element 20, a clamping action on the pad 12A and, as a result of the reaction effect on the face 26, a clamping action on the pad 12B, the effect of which is to grip the disk 10 between the pads 12A and 12B. The brake is applied.

During operation, the linings 13 of the pads 12A and 12B become worn. The clamping element 20 is allowed to advance towards the left in FIG. 1 for clamping purposes all the more, the more the linings 13 are worn.

As a result of the wear-compensating device which has just been described, the wear is compensated and the forward and return stroke of the clamping element 20 between its retracted release position and its advanced clamping position is maintained between two closely set constant values, the variation between which is defined by the length of each tooth 45 of the ratchet wheel 40.

More particularly, as long as the wear does not cause the pawl 41 to jump a tooth of the wheel 40, the shaft 44 is kept locked as a result of the predominant clamping effect of the washer 52 on the support. When the wear of the friction means 12A and 12B, by becoming more pronounced, causes the pawl 41 to jump a tooth of the wheel 40, the pawl 41, after jumping a tooth in this way, is allowed to carry the wheel 40 along with it, and this time the washers 50 and 51 as a whole have a clamping effect which predominates in relation to the washer 52, and the shaft 44 is driven in rotation, the effect of which is, by means of the endless screw 29 and the gear wheel 28, to cause rotation of the screw 22, whilst the nut 23 is maintained fixed angularly by the pad 27. The assembly 22, 23 undergoes extension. The wear is compensated.

The particularly simple and convenient construction of the device according to the invention and its excellent mode of operation will be appreciated.

The invention is not of course limited to the embodiment described and illustrated, but embraces all alternative forms in the construction of its various elements and its uses, within the scope of the claims.

I claim:

1. Clamping device, such as a brake, comprising: a body which is to be clamped, such as a rotating disc; friction means operable to apply a clamping force to the body; a clamping element movable between a return release position and an advansed clamping position in which it urges the friction means into clamping engagement with the body; control means for controlling the clamping device and a support carrying the clamping element and displaceable during the forward movement of the clamping element and during the return movement under the action of control means; the support comprising a part extendable in response to angular displacement of a ratchet wheel, the ratchet wheel being cooperable with a pawl attached to the control means; a transmission member operably disposed between the ratchet wheel and the extendable part, a first friction element (A) operatively interposed between the ratchet wheel and the transmission member, a second friction element (B) operatively interposed between the pawl and the transmission member, and a third friction element (C) operatively interposed between the support and the transmission member, the frictional resistance (RC) of the third friction element being greater than the frictional resistance (RB) of the second friction element and the sum of the frictional resistances of the first and second friction elements (RA+RB) being greater than that (RC) of the third friction element, whereby in response to angular movement of the ratchet wheel, against the frictional resistance of the third friction element, the extendable part is extended to compensate for wear of the friction means.

2. Device according to claim 1, wherein the advanced clamping position of the clamping element advances toward the friction means as a function of wear of the friction means.

3. Device according to claim 1, wherein the extendable part comprises a screw and nut in threaded engagement, the screw and nut tending to extend in response to the angular displacement of the ratchet wheel.

4. Device according to claim 3, wherein the screw is rotatably connected to the ratchet wheel and the nut advances toward the friction means in response to the angular displacement of the ratchet wheel.

5. Device according to claim 1, wherein the transmission member comprises a shaft mounted to rotate on the support, the pawl and the ratchet wheel themselves being mounted to rotate on the support coaxially with the shaft.

6. Device according to claim 5, wherein the shaft is connected to the extendable part by means of a worm and a gear wheel meshing therewith.

7. Device according to claim 6, wherein the friction elements (A, B, C,) comprise friction washers, common elastic means loading the first, second and third friction elements.

8. Device according to claim 5 and a manual setting means attached to the shaft for setting the angular position of the shaft.

* * * * *